United States Patent
Yan

(10) Patent No.: US 9,382,409 B2
(45) Date of Patent: Jul. 5, 2016

(54) AMINE FUNCTIONALIZED POLYMER

(71) Applicant: Yuan-Yong Yan, Copley, OH (US)

(72) Inventor: Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 272 days.

(21) Appl. No.: 14/170,880

(22) Filed: Feb. 3, 2014

(65) Prior Publication Data
US 2014/0148527 A1 May 29, 2014

Related U.S. Application Data

(63) Continuation of application No. 13/371,338, filed on Feb. 10, 2012, now Pat. No. 8,642,706, which is a continuation of application No. 11/542,836, filed on Oct. 4, 2006, now abandoned.

(60) Provisional application No. 60/723,472, filed on Oct. 4, 2005.

(51) Int. Cl.
| | | |
|---|---|---|
| C08F 8/32 | (2006.01) |
| C08L 9/06 | (2006.01) |
| C08C 19/22 | (2006.01) |
| C08C 19/25 | (2006.01) |
| C08C 19/44 | (2006.01) |
| C08F 8/30 | (2006.01) |
| C08F 8/42 | (2006.01) |
| C08K 3/00 | (2006.01) |
| C08F 236/10 | (2006.01) |
| C08K 3/04 | (2006.01) |
| C08F 212/08 | (2006.01) |
| C08F 2/06 | (2006.01) |
| C08F 236/06 | (2006.01) |
| C08F 4/08 | (2006.01) |

(52) U.S. Cl.
CPC . *C08L 9/06* (2013.01); *C08C 19/22* (2013.01); *C08C 19/25* (2013.01); *C08C 19/44* (2013.01); *C08F 8/30* (2013.01); *C08F 8/32* (2013.01); *C08F 8/42* (2013.01); *C08F 236/10* (2013.01); *C08K 3/0033* (2013.01); *C08K 3/04* (2013.01); *C08F 2/06* (2013.01); *C08F 4/08* (2013.01); *C08F 212/08* (2013.01); *C08F 236/06* (2013.01)

(58) Field of Classification Search
CPC ............ C08F 2/06; C08F 4/08; C08F 212/08; C08F 236/06; C08F 236/10; C08F 8/32
See application file for complete search history.

(56) References Cited

U.S. PATENT DOCUMENTS

| 6,075,092 A * | 6/2000 | Nakamura | C08G 65/14 525/122 |
| 8,642,706 B2 * | 2/2014 | Yan | 525/386 |
| 2005/0171251 A1 * | 8/2005 | Nakajima | C08L 95/00 524/59 |

FOREIGN PATENT DOCUMENTS

JP WO 03091339 A1 * 11/2003 ............ C08L 95/00

* cited by examiner

*Primary Examiner* — Richard A Huhn
(74) *Attorney, Agent, or Firm* — Meredith E. Hooker; David G. Burleson

(57) ABSTRACT

A macromolecule includes a functional group including imine functionality bonded to a polymer chain. Where desired, the functional group also can contain additional (e.g., amine and/or silane) functionality. The material can be provided by reacting a polymer including carbonyl functionality with a compound including a primary amino group. The functional group can interact with particulate filler such as, e.g., carbon black and silica.

17 Claims, No Drawings

AMINE FUNCTIONALIZED POLYMER

CROSS-REFERENCE TO RELATED APPLICATIONS

This is a continuation of U.S. patent application Ser. No. 13/371,338, filed 10 Feb. 2012 which issued as U.S. Pat. No. 8,642,706 on 4 Feb. 2014, which was a continuation of U.S. patent application Ser. No. 11/542,836, filed 4 Oct. 2006, which claimed priority to and the benefit of U.S. provisional application No. 60/723,472, filed 4 Oct. 2005, the complete disclosures of which are incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in tire rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemical modifications to the terminal ends of the polymers.

Where an elastomer is made by anionic polymerization techniques, attachment of certain functional groups is difficult. Living polymers are terminated by active hydrogen atoms such as are present in, e.g., primary and secondary amine groups. However, amine functional groups can provide desirable interaction with particulate fillers, particularly carbon black. Therefore, commercially useful methods of providing living polymers with terminal amine functionality remains desirable.

Additionally, methods of functionalization that allow or provide flexibility with respect to the type(s) of functional groups that can be attached also remain desirable. Particularly desirable are methods that can provide functionality capable of interacting with such diverse fillers as silica and carbon black.

SUMMARY

In one aspect is provided a macromolecule that includes a polymer chain and, bonded thereto, a functional group including imine functionality.

In another aspect is provided a functional polymer that includes the reaction product of a polymer including carbonyl functionality and a compound including a primary amino group.

In either of the preceding aspects, the functional group can contain additional functionality, examples of which include amine and/or silane functionality. Where both types of functionality are present, interactivity with diverse filler materials such as silica and carbon black can be provided.

The functional group included in the just mentioned macromolecule and provided in the foregoing functionalized polymer can interact with particulate filler such as, e.g., carbon black and silica. Compositions that include particulate fillers and the macromolecule or the functionalized polymer also are provided.

Other aspects of the present invention will be apparent to the ordinarily skilled artisan from the description that follows. To assist in understanding the description of various embodiments that follows, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"macromolecule" means a polymer that includes at least one group or substituent not originating or derived from its constituent mer units;

"polyene" means a molecule with at least two double bonds located in the longest portion or chain thereof, and specifically is inclusive of dienes, trienes, and the like;

"terminus" means an end of a polymeric chain;

"terminal moiety" means a group or functionality located at a terminus; and

"substituted," when used in conjunction with a particular species or type of functional group, means that the group can contain a heteroatom or functionality that does not interfere with the intended purpose of the group.

DETAILED DESCRIPTION OF ILLUSTRATIVE EMBODIMENTS

The macromolecule includes a polymeric chain with at least one functional group attached thereto, and those group(s) can constitute the "at least one group or substituent" in the foregoing definition of macromolecule.

The polymeric chain can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene. Homo- and interpolymers that include just polyene-derived mer units constitute one illustrative type of elastomer.

The polymeric chain also can include pendent aromatic groups such as can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1 to about 50% by wt., from about 10 to about 45% by wt., or from about 20 to about 35% by wt., of the polymer chain; such interpolymers constitute one exemplary class of polymers. The microstructure of such interpolymers can be random, i.e., the mer units derived from each type of constituent monomer preferably do not form blocks and, instead, are incorporated in a non-repeating, essentially simultaneous manner. Random microstructure can provide particular benefit in certain end use applications such as, e.g., rubber compositions used in the manufacture of tire treads.

Exemplary elastomers include poly(butadiene), (poly)isoprene (either natural or synthesized), and interpolymers of butadiene and styrene such as, e.g., copoly(styrene/butadiene) also known as SBR.

Polyenes can incorporate into polymeric chains in more than one way. Especially for tire tread applications, controlling this manner in which polyenes incorporate themselves into the polymer chain (i.e., the 1,2-microstructure of the polymer) can be desirable. A polymer chain with an overall 1,2-microstructure, based on total polyene content, of from about 10 to about 80%, optionally from about 25 to 65%, can be desirable for certain end use applications. A polymer that has an overall 1,2-micro-structure of no more than about 50%, preferably no more than about 45%, more preferably no more than about 40%, even more preferably no more than about 35%, and most preferably no more than about 30%, based on total polyene content, is considered to be "substantially linear".

The number average molecular weight ($M_n$) of the polymer typically is such that a quenched sample exhibits a gum Mooney viscosity ($ML_4/100°$ C.) of from about 2 to about 150, more commonly 2.5 to about 100.

Elastomers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Solution polymerization typically involves an initiator. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyl-lithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., WO 2004/041870) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization of the mer units and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds having a heteroatom with a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes such as 2,2'-di(tetrahydrofuryl) propane, di-piperidyl ethane, hexamethylphosphoramide, N,N'-dimethylpiperazine, diazabicyclooctane, diethyl ether, tributylamine, and the like. Details of linear and cyclic oligomeric oxolanyl coordinators can be found in, e.g., U.S. Pat. No. 4,429,091.

Although the ordinarily skilled artisan understands the type of conditions typically employed in solution polymerization, a representative description is provided for the convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

At this point, the polymer can be provided with a functional group that includes imine functionality ($>C=N-$), optionally further defined as $>C=N-(CH_2)_n-$ where n is an integer of from 1 to 10 inclusive or, in some embodiments, an integer of from 2 to 6 inclusive. (The alkylene group is optional, so n can be 0.) Thus, an alkylene group can be used to link the imine nitrogen atom to other portions of the functionality such as, e.g., additional functional groups.

One method of effecting this functionalization involves a two steps: a polymer is provided with carbonyl functionality and then that functionality can be reacted with an amine-containing compound.

Carbonyl functionality can be provided by introducing to the polymer cement an aldehyde or ketone in which the carbonyl carbon atom is bonded directly to a heteroatom-containing leaving group. Such materials can be represented by the general formula $R^1C(O)$-$QR^2$ where $R^1$ is a hydrogen atom or a moiety of the formula —$CH_2Z$ where Z is a hydrogen atom or a substituted or unsubstituted aryl, alkyl, alkenyl, alkenaryl, aralkenyl, alkaryl, or aralkyl group;

$R^2$ is a moiety of the formula —$CH_2Z$ where Z is defined as above or, optionally, $R^1$ and $R^2$ together form a cyclic structure (preferably a 5-7 membered ring) optionally incorporating one or more heteroatoms such as, e.g., N, O, or S; and Q is an oxygen atom, sulfur atom, or a $NR^3$ moiety with $R^3$ being a substituted or unsubstituted aryl, alkyl, alkenyl, alkenaryl, aralkenyl, alkaryl, or aralkyl group or, optionally, $R^2$ and $R^3$ together can form a cyclic structure (preferably a 5-7 membered ring).

Carbonyl-containing compounds represented by the foregoing general formula include but are not limited to esters such as alkyl acetates (e.g., ethyl acetate), methyl methacrylate, and alkyl benzoates; lactones such as γ-valerolactone, ε-caprolactone, propylene carbonate, and 2,2,5-trimethyl-1,3-dioxane-4,6-dione; acid anhydrides such as 4-methylphenyl-succinic anhydride, 2-dodecen-1-yl succinic anhydride, and methyl-succinic anhydride; thiol esters such as cyclohexyl thiolacetate, phenyl thiolacetate, and thiolesters of aromatic acids (e.g., the cyclohexyl thiolester of benzoic acid); amides such as dialkylformamides (e.g., N,N-dimethylformamide (DMF)), N-formylpyrrolidine, N-formylpiperidine, 4-formylmorpholine, N-methylformanilide, and N,N-diphenylform-amide; and lactams including imidazolidinones (e.g., 1,3-dimethyl-2-imidazolidinone (DMI)), pyrrolidinones (e.g., 1-methyl-2-pyrrolidinone (NMP)), pyrimidinones (e.g., 1,3-dimethyl-3,4,5,6-tetrahydro-2(1H)-pyrimidinone (DMP)), and sarcosine anhydride; and the like.

Of the foregoing materials, heterocyclic compounds that include within their ring structures a nitrogen atom and a carbonyl group, particularly those that contain a —$NR^3$—C(O)— segment where $R^3$ is defined as above, can provide particularly desirable properties in some filled compositions.

When a compound of the type just described is added to a polymer cement containing living polymer (carbanion) chains, the carbonyl carbon atom reacts at the anion, typically located at the end of the longest chain. (Where a multifunctional initiator is employed during polymerization, reaction with the foregoing types of compounds typically occurs on each terminus of the polymer.) Where the carbonyl carbon atom is part of a cyclic structure, the ring opens at the carbonyl carbon atom.

Because of the reactivity of living polymers with compounds of the type just described, this reaction can be performed quickly (e.g., ~15-60 minutes) using relatively mild (e.g., ~25°-75° C. and atmospheric or slightly elevated pressures) anhydrous and anaerobic conditions. Mixing of a type commonly employed in commercial processes is sufficient to ensure near stoichiometric reaction.

At this point, the functionalized living polymer includes a carbonyl-containing group, typically at a terminus. Where an acyclic material has been used to provide the carbonyl functionality, the functionalized polymer typically includes an aldehyde group; where a cyclic material is used to provide the carbonyl functionality, the functionalized polymer includes a ketone group, with the remainder of the opened ring structure forming the non-polymeric portion of the ketone. Use of acyclic materials can be preferred in certain circumstances.

Imine functionality can be provided by reacting the carbonyl group with a compound that includes an amine group, preferably a primary amine group, and at least one additional functional group such as, for example, an amine and/or silane group. Examples of useful compounds include, but are not limited to, polyamines such as, e.g., aminoethylethanolamine, aminopropyl-monomethylethanolamine, diethylenetriamine, trimethylenetetraamine, 1,4-cyclohexanebis(methylamine), 1,3-phenylenediamine, 1,4-phenyl-enediamine, m- or p-xylylenediamine, N-aminoethylpiperazine, dimethylaminopropylamine, polyoxyalkyleneamines such as the D-, XTJ-, and T-series of Jeffamine™ materials (Huntsman LLC; Houston, Tex.), and compounds of the general formula $H_2N(CH_2)_nNH_2$ where n is an integer of from 2 to 12 inclusive;

amine-functional silanes such as aminoalkyltrialkoxysilanes (e.g., 3-aminopropyltrimethoxysilane (APMOS), 3-aminopropyltriethoxy-silane (APEOS), [3-(methylamino)propyl]trimethoxysilane, etc.) and alkylamines with alkoxyalkylsilane functionality such as, e.g., 3-(diethoxymethylsilyl)propylamine; and combinations of these, i.e., polyamines with alkoxysilane functionality such as, e.g., N-[3-(trimethoxysilyl)propyl]ethylenediamine and N'[3-(trimethoxysilyl)propyl] diethylenetriamine.

This imine-creating reaction can be performed relatively quickly (e.g., ~30-500 minutes) using relatively mild conditions (e.g., ~25°-75° C. and atmospheric or slightly elevated pressures). Anhydrous and anaerobic are not necessary but can be maintained if desired. Mixing of a type commonly employed in commercial processes typically is sufficient to ensure good conversion.

The imine-functional polymer or macromolecule need not be quenched, although such a step need not be eliminated if a manufacturing process employing quenching already is in place.

Solvent can be removed from the polymer cement by conventional techniques such as drum drying, extruder drying, vacuum drying or the like, which may be combined with coagulation with water, alcohol or steam, thermal desolventization, etc.; if coagulation is performed, oven drying may be desirable.

The functionalized polymer can be utilized in a tread stock compound or can be blended with any conventionally employed tread stock rubber including natural rubber and/or non-functionalized synthetic rubbers such as, e.g., one or more of poly(isoprene), SBR, poly(butadiene), butyl rubber, neoprene, ethylene/propylene rubber (EPR), ethylene/propylene/diene rubber (EPDM), acrylonitrile/butadiene rubber (NBR), silicone rubber, fluoroelastomers, ethylene/acrylic rubber, ethylene/vinyl acetate interpolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% by wt. of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface area include from about 32 to about 400 $m^2/g$, about 100 to about 250 $m^2/g$, and about 150 to about 220 $m^2/g$.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

Silica can be employed in the amount of about 1 to about 100 parts by weight (pbw) per 100 parts of polymer (phr), preferably in an amount from about 5 to about 80 phr. The useful upper range is limited by the high viscosity imparted by fillers of this type.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; surface area values can be determined by ASTM D-1765 using the cetyltrimethyl-ammonium bromide (CTAB) technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical. When carbon black is used with silica, the amount of silica can be decreased to as low as about 1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 30 to 100 phr.

When silica is employed as a reinforcing filler, addition of a coupling agent such as a silane is customary so as to ensure good mixing in, and interaction with, the elastomer(s). Generally, the amount of silane that is added ranges between about 4 and 20% by weight, based upon the weight of silica filler present in the elastomeric compound.

Coupling agents can have a general formula of A-T-X, in which A represents a functional group capable of bonding physically and/or chemically with a group on the surface of the silica filler (e.g., surface silanol groups); T represents a hydrocarbon group linkage; and X represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the X and A functionalities mentioned above. One preferred coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful, as set forth below. The additional fillers can be utilized in an amount of up to about 40 phr, typically up to about 20 phr.

Other conventional rubber additives also can be added. These include, for example, process oils, plasticizers, anti-degradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at a temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, N.Y., 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly ~170° C.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Butadiene (21.4% by wt. in hexane), styrene (33% by wt. in hexane), hexane, n-butyllithium (1.60 M in hexane), 2,2-bis(2'-tetrahydrofuryl)propane (1.6 M solution in hexane, stored over $CaH_2$), and butylated hydroxytoluene (BHT) solution in hexane were used.

Commercially available reagents and starting materials included the following, all of which were acquired from Sigma-Aldrich Co. (St. Louis, Mo.) and used without further purification unless otherwise noted in a specific example: DMF, DMI, NMP, DMP, APMOS, APEOS, 3-(diethoxymethylsilyl)propylamine, N-[3-(trimethoxysilyl)-propyl]ethylenediamine, and N'[3-(trimethoxysilyl)propyl]diethylenetriamine.

Testing data in the Examples was performed on filled compositions made according to the formulation shown in Tables 1a (carbon black only) and 1b (carbon black and silica). In these tables, N-phenyl-N'-(1,3-dimethylbutyl)-p-phenyl-diamine acts as an antioxidant, benzothiazyl-2-cyclohexyl-sulfenamide and N,N'-diphenyl guanidine act as accelerators, and N-(cyclohexylthio)phthalimide acts as an inhibitor.

TABLE 1a

Compound formulation, carbon black only

| | Amount (phr) |
|---|---|
| Masterbatch | |
| polymer | 100 |
| carbon black (N343 type) | 55 |
| wax | 1 |
| N-phenyl-N'-(1,3-dimethylbutyl)-p-phenylenediamine | 0.95 |
| ZnO | 2.5 |
| stearic acid | 2 |
| aromatic processing oil | 10 |
| Final | |
| sulfur | 1.3 |
| N-cyclohexylbenzothiazole-2-sulfenamide | 1.7 |
| N,N'-diphenylguanidine | 0.2 |
| TOTAL | 174.65 |

TABLE 1b

Compound formulation, carbon black and silica

| | Amount (phr) |
|---|---|
| Masterbatch | |
| polymer | 100 |
| silica | 30 |
| carbon black (N343 type) | 35 |
| N-phenyl-N'-(1,3-dimethylbutyl)-p-phenyldiamine | 0.95 |
| stearic acid | 1.5 |
| aromatic processing oil | 10 |
| Re-mill | |
| 60% disulfide silane on carrier | 4.57 |
| Final | |
| ZnO | 2.5 |
| sulfur | 1.7 |
| N-cyclohexylbenzothiazole-2-sulfenamide | 1.5 |
| N-(cyclohexylthio)phthalimide | 0.25 |
| N,N'-diphenyl guanidine | 0.5 |
| TOTAL | 188.47 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Bound Rubber" were determined using the procedure described by J. J. Brennan et al., *Rubber Chem. and Tech.*, 40, 817 (1967).

Examples 1-5

To a $N_2$-purged reactor equipped with a stirrer was added 1.53 kg hexane, 0.41 kg styrene solution, and 2.54 kg butadiene solution. The reactor was charged with 4.03 mL n-butyllithium, followed by 1.18 mL of the 2,2-bis(2'-tetrahydrofuryl)propane solution.

The reactor jacket was heated to 50° C., and after ~30 minutes the batch temperature peaked at ~62° C.

After an additional ~30 minutes, some of the polymer cement was transferred from the reactor to dried glass vessels. This became sample 1 (a control), while the remaining cement in the reactor was allowed to undergo further reaction, i.e., the 2-step functionalization described above. To the remaining cement in the reactor was added 0.7 mL DMF (6.0 M in toluene) in 5 mL THF and 20 mL hexane; this mixture was stirred at ~50° C. for ~40 minutes.

Thereafter, portions of the cement were transferred to dried glass vessels. To each was added a further reactant:

2—0.7 mL propylenediamine (1.0 M),

3—0.7 mL APEOS (1.0 M),

4—0.7 mL APMOS (1.0 M), and

5—a solution of 3 mL N[3-(trimethoxysilyl)propyl]ethylenediamine (1.0 M) in 10 mL hexane.

These mixtures were stirred at ~50° C. for ~60 more minutes.

Each of samples 1-5 was coagulated in isopropanol containing BHT and drum dried.

Using the formulations shown in Tables 1a and 1b, vulcanizable elastomeric compounds containing reinforcing fillers were prepared from samples 1-5. Results of physical testing on these compounds are shown below in Table 2; for those rows that include two data points, the upper is for a formulation from Table 1a, and the lower is for a formulation from Table 1b.

TABLE 2

Testing data from Examples 1-5

| | 1 | 2 | 3 | 4 | 5 |
|---|---|---|---|---|---|
| $M_n$ (kg/mol) | 100 | 149 | 178 | 184 | 176 |
| $M_w/M_n$ | 1.04 | 1.31 | 1.69 | 1.79 | 1.75 |
| % coupling | 1.5 | 56.8 | 64.7 | 64.8 | 60.6 |
| $T_g$ (° C.) | −38.6 | −39.0 | −39.1 | −39.0 | −38.8 |
| Bound rubber (%) | 11.1 | 26.4 | 34.3 | 36.9 | 43.0 |
| | 22.5 | 35.5 | 47.0 | 49.7 | 50.3 |
| 171° C. MDR $t_{50}$ (min) | 3.14 | 2.85 | 2.61 | 2.60 | 2.31 |
| | 7.86 | 7.02 | 6.45 | 6.17 | 5.77 |

TABLE 2-continued

Testing data from Examples 1-5

|  | 1 | 2 | 3 | 4 | 5 |
|---|---|---|---|---|---|
| 171° C. MH-ML (kg-cm) | 18.3 | 18.3 | 17.7 | 16.8 | 16.8 |
|  | 21.8 | 22.6 | 20.4 | 19.6 | 19.3 |
| $ML_{1+4}$ @ 130° C. | 22.3 | 43.6 | 47.1 | 45.9 | 45.2 |
|  | 61.4 | 90.5 | 81.2 | 76.5 | 72.9 |
| 300% modulus @ 23° C. (MPa) | 11.4 | 13.0 | 13.8 | 13.3 | 13.7 |
|  | 9.4 | 11.3 | 12.6 | 12.2 | 13.2 |
| Tensile strength @ 23° C. (MPa) | 16.4 | 18.2 | 20.5 | 19.3 | 19.6 |
|  | 14.2 | 16.9 | 17.6 | 15.7 | 18.4 |
| Temp. sweep 0° C. tan δ | 0.211 | 0.218 | 0.230 | 0.232 | 0.241 |
|  | 0.165 | 0.171 | 0.194 | 0.194 | 0.199 |
| Temp. sweep 50° C. tan δ | 0.274 | 0.222 | 0.208 | 0.203 | 0.180 |
|  | 0.230 | 0.197 | 0.205 | 0.195 | 0.195 |
| RDA 0.25-14% ΔG' (MPa) | 4.423 | 1.747 | 1.669 | 1.419 | 1.023 |
|  | 8.364 | 5.208 | 2.712 | 2.661 | 2.310 |
| 50° C. RDA strain sweep (5% strain) tan δ | 0.2570 | 0.1684 | 0.1655 | 0.1521 | 0.1338 |
|  | 0.2527 | 0.2004 | 0.1741 | 0.1842 | 0.1711 |
| 50° C. Dynastat tan δ | 0.2512 | 0.1635 | 0.1617 | 0.1572 | 0.1343 |
|  | 0.2208 | 0.1936 | 0.1816 | 0.1805 | 0.1739 |

From the 50° C. strain sweep data of Table 2, one can see that styrene/butadiene interpolymers having imine functional groups (Examples 2-5) can provide, compared to a control polymer, significant reductions in tan δ (~35-50% for carbon black only and ~20-33% for carbon black plus silica formulations, respectively). At the same time, wet traction performance (see the tan δ at 0° C. data, where larger values correlate generally to better wet traction) is not negatively impacted to any significant extent.

Examples 6-9

The procedure described with respect to Examples 1-5 was, in substantial part, repeated. Specifically, the same amounts and concentrations of reactant materials were used.

The reactor jacket was heated to 50° C., and after ~28 minutes the batch temperature peaked at ~63° C.

After an additional ~30 minutes, some of the polymer cement was transferred from the reactor to dried glass vessels. This became sample 6 (a control), while the remaining cement in the reactor was allowed to undergo further reaction, i.e., the 2-step functionalization described above. To the remaining cement in the reactor was added 5 mL DMI (1.0 M in toluene); this mixture was stirred at ~50° C. for ~40 minutes.

Thereafter, portions of the cement were transferred to dried glass vessels. To each was added a further reactant:

7—0.8 mL APEOS (1.0 M),
8—0.8 mL APMOS (1.0 M), and
9—0.8 mL N-[3-(trimethoxysilyl)propyl]ethylenediamine (1.0 M) in hexane.

These mixture were stirred at ~50° C. for ~60 more minutes.

Each of samples 6-9 was coagulated in isopropanol containing BHT and drum dried.

Using the formulations shown in Tables 1a and 1b, vulcanizable elastomeric compounds containing reinforcing fillers were prepared from samples 6-9. Results of physical testing on these compounds are shown below in Table 3; for those rows that include two data points, the upper is for a formulation from Table 1a, and the lower is for a formulation from Table 1b.

TABLE 3

Testing data from Examples 6-9

|  | 6 | 7 | 8 | 9 |
|---|---|---|---|---|
| $M_n$ (kg/mol) | 99 | 119 | 98 | 99 |
| $M_w/M_n$ | 1.06 | 1.19 | 1.06 | 1.11 |
| % coupling | 2.1 | 32.2 | 2.3 | 3.4 |
| $T_g$ (° C.) | −38.5 | −39.0 | −39.0 | −39.0 |
| Bound rubber (%) | 11.0 | 38.5 | 37.6 | 39.4 |
|  | 18.8 | 33.6 | 27.7 | 27.7 |
| 171° C. MDR $t_{50}$ (min) | 3.19 | 1.95 | 1.67 | 1.78 |
|  | 7.67 | 4.90 | 5.03 | 4.78 |
| 171° C. MH-ML (kg-cm) | 17.8 | 16.0 | 16.2 | 15.6 |
|  | 22.5 | 17.5 | 17.0 | 17.9 |
| $ML_{1+4}$ @ 130° C | 23.3 | 46.1 | 37.1 | 37.1 |
|  | 61.7 | 95.0 | 92.9 | 94.0 |
| 300% modulus @ 23° C. (MPa) | 10.9 | 14.0 | 14.0 | 13.2 |
|  | 8.5 | 11.0 | 10.9 | 11.5 |
| Tensile strength @ 23° C. (MPa) | 16.9 | 20.8 | 19.3 | 19.8 |
|  | 13.1 | 16.0 | 16.5 | 16.4 |
| Temp. sweep 0° C. tan δ | 0.196 | 0.229 | 0.234 | 0.233 |
|  | 0.172 | 0.192 | 0.189 | 0.184 |
| Temp. sweep 50° C. tan δ | 0.258 | 0.147 | 0.156 | 0.162 |
|  | 0.223 | 0.180 | 0.198 | 0.188 |
| RDA 0.25-14% ΔG' (MPa) | 4.234 | 0.429 | 0.402 | 0.463 |
|  | 8.522 | 2.021 | 2.510 | 2.666 |

TABLE 3-continued

Testing data from Examples 6-9

|  | 6 | 7 | 8 | 9 |
|---|---|---|---|---|
| 50° C. RDA strain sweep (5% strain) tan δ | 0.2546 | 0.1018 | 0.1050 | 0.1139 |
|  | 0.2506 | 0.1612 | 0.1782 | 0.1712 |
| 50° C. Dynastat tan δ | 0.2437 | 0.1066 | 0.1100 | 0.1175 |
|  | 0.2136 | 0.1626 | 0.1742 | 0.1629 |

From the 50° C. strain sweep data of Table 3, one can see that styrene/butadiene interpolymers having imine functional groups (Examples 7-9) can provide, compared to a control polymer, significant reductions in tan δ (~55-60% for carbon black only and ~30-35% for carbon black plus silica formulations, respectively). Comparing these results to those from Table 2, one can see that the compound from which the carbonyl is derived (DMF for Examples 2-5 and DMI for Examples 7-9) apparently can have some effect on the hysteresis reduction provided by the terminal functional group.

Turning to wet traction performance (as indicated by the tan δ at 0° C. data, where larger values correlate generally to better wet traction), one can see that styrene/butadiene interpolymers having imine functional groups (Examples 7-9) can provide, compared to a control polymer, improved performance. This is of particular benefit because improved hysteresis often requires a sacrifice in wet traction performance.

That which is claimed is:

1. A method of making a functional polymer comprising:
   a) in a vessel that includes solvent and carbanionic polymer that consists of polyene mer or random polyene and vinyl aromatic mer, reacting under anhydrous conditions said carbanionic polymer with a compound having the general formula $R^1C(O)—QR^2$ wherein
      $R^1$ is a hydrogen atom or $R^2$,
      each $R^2$ independently is a moiety of the formula $—CH_2Z$ where Z is a hydrogen atom or a substituted or unsubstituted aryl, alkyl, alkenyl, alkenaryl, aralkenyl, alkaryl or aralkyl group, or $R^1$ and $R^2$ together join so as to form a cyclic structure, and
      Q is an oxygen atom or a sulfur atom,
   so as to provide a polymer that comprises carbonyl functionality at a terminus thereof, and
   b) adding to and mixing with said polymer that comprises carbonyl functionality at a terminus thereof only a compound that comprises a primary amino group, thereby permitting said compound to react with the carbonyl functionality so as to provide a polymer comprising a terminal moiety that comprises imine functionality defined by the general formula $>C=N—(CH_2)_n—$ where n is an integer of from 0 to 10 inclusive.

2. The method of claim 1 wherein $R^1$ in said compound that reacts with said carbanionic polymer is a hydrogen atom.

3. The method of claim 1 wherein said compound that comprises a primary amino group further comprises additional amine functionality.

4. The method of claim 1 wherein said compound that comprises a primary amino group further comprises silane functionality.

5. The method of claim 4 wherein said compound that comprises a primary amino group and silane functionality is an aminoalkyltrialkoxysilane.

6. The method of claim 4 wherein said compound that comprises a primary amino group and silane functionality is an alkylamine comprising alkoxyalkylsilane functionality.

7. The method of claim 1 wherein said carbanionic polymer is substantially linear.

8. The method of claim 1 wherein n is zero.

9. The method of claim 1 wherein n is an integer of from 1 to 10 inclusive.

10. The method of claim 1 wherein Q in said compound that reacts with said carbanionic polymer is an oxygen atom.

11. The method of claim 10 wherein said compound that reacts with said carbanionic polymer is an alkyl acetate.

12. The method of claim 10 wherein $R^1$ and $R^2$ in said compound that reacts with said carbanionic polymer together join so as to form a cyclic structure.

13. The method of claim 12 wherein said compound that reacts with said carbanionic polymer is a lactone.

14. The method of claim 1 further comprising providing a composition comprising said functional polymer and at least one type of particulate filler.

15. The method of claim 14 wherein said composition further comprises at least one other type of polymer selected from natural rubber and a non-functionalized synthetic rubber.

16. The method of claim 14 further comprising heating said composition so as to form a vulcanizate.

17. The method of claim 16 further comprising forming a tire component from said vulcanizate.

* * * * *